United States Patent
Gagne

[15] 3,661,030
[45] May 9, 1972

[54] BALL SCREW AND NUT COMBINATION

[72] Inventor: Oscar J. Gagne, Grosse Pointe, Mich.
[73] Assignee: Precise Services, Inc., Detroit, Mich.
[22] Filed: May 18, 1970
[21] Appl. No.: 38,454

[52] U.S. Cl. ................................................ 74/459
[51] Int. Cl. ............................................ F16h 55/10
[58] Field of Search ........................... 74/459, 424.8

[56] References Cited

UNITED STATES PATENTS

| | | | |
|---|---|---|---|
| 3,529,486 | 9/1970 | Galonska et al. | 74/459 |
| 2,855,792 | 10/1958 | Gates | 74/459 |
| 3,296,880 | 1/1967 | Maroth | 74/459 X |
| 2,505,131 | 4/1950 | Means, Jr. | 74/459 |
| 2,636,397 | 4/1953 | Jacubenta | 74/459 |
| 3,073,177 | 1/1963 | Grabowski | 74/459 |
| 3,302,477 | 2/1967 | Grabowski | 74/424.8 |
| 2,343,507 | 3/1944 | Hoffar | 74/459 |
| 3,327,551 | 6/1967 | Prueter | 74/459 X |
| 3,145,580 | 8/1964 | Galonska et al. | 74/459 |

*Primary Examiner*—Arthur T. McKeon
*Attorney*—Whittemore, Hulbert & Belknap

[57] ABSTRACT

A ball screw and nut combination in which the nut is essentially cylindrical in configuration, is provided with internal threads and a plurality of openings extending generally tangentially into a thread groove and communicating with a helically formed groove or recess at the exterior in helical alignment with but spaced by a smooth cylindrical uninterrupted exterior surface of the nut from a similar helical groove communicating with a second opening communicating tangentially with a thread groove. A cover of sheet material such as metal or plastic is attached overlying the openings and helically extending grooves or channels, the cover having a helically extending groove communicating with said openings and recesses or channels and the smooth exterior surface of the nut to define an enclosed ball return passage interconnecting the openings.

5 Claims, 7 Drawing Figures

INVENTOR
OSCAR J. GAGNE
BY *Whittemore,*
*Hulbert & Belknap*
ATTORNEYS

INVENTOR
OSCAR J. GAGNE
BY Whittemore
Hulbert & Belknap
ATTORNEYS ically extending bar adapted to be received in a short portion
3,661,030

1
BALL SCREW AND NUT COMBINATION

BRIEF SUMMARY OF THE INVENTION

The ball screw and nut combination comprises a screw of usual configuration having a helically extending ball receiving groove. Associated with the screw and relatively movable longitudinally thereof upon relative rotation therebetween is a nut of special design. Essentially, the nut comprises a cylindrical body which may at one end have an externally threaded extension for connection to a device to be moved longitudinally of the screw. The nut is provided with one or more ball return passages and these passages include openings which communicate substantially tangentially with thread grooves formed at the interior of the nut body. Each of the openings is in communication with a helically extending groove or channel which extends toward but is spaced from a cooperating groove or channel which in turn communicates with another opening extending generally tangentially into an internal thread groove in the nut. Accordingly, each of the grooves or channels which connects to an opening is of diminishing depth and runs out so that a smooth uninterrupted cylindrical surface area at the external surface of the nut lies between the adjacent ends of communicating grooves or channels.

The ball return passage is completed by a generally partially cylindrical relatively thin plastic cover which is deformed to provide internal grooves or channels adapted to interconnect a cooperating pair of openings and to overlie the helically extending grooves or channels at the exterior of the nut body. Accordingly, the helically extending grooves or channels associated with a cooperating pair of openings in the nut body and the grooved portion of the cover define a helically extending ball return passage, a substantially intermediate portion of which is formed by the smooth uninterrupted exterior surface of the nut body.

Ball deflecting elements are provided which include a helically extending bar adapted to be received in a short portion of a thread groove in the nut body and to occupy a corresponding portion of the mating thread on the screw. The end surfaces of the helical bar are concavely formed and are positioned to form extensions of the openings through the nut which extend generally tangentially into the thread grooves. The arrangement is such that as a ball is caused to roll around the thread groove of the nut, it eventually engages one end of the helical bar and is forced through the tangential opening into the ball passage along which it is advanced and eventually caused to re-enter the ball nut through the associated opening.

Each of the helical bars includes a generally radially extending stem having at its end a head spaced from the stem by an annular groove. The stem extends through a radial opening in the nut body and through an opening in the plastic cover. Suitable means such for example as a U-shaped or C-shaped clip engages in the annular groove beneath the head of the stem and serves to retain the bar and the plastic cover in place.

Preferably, each nut includes a pair of cooperating openings and the plastic cover is accordingly provided with a pair of generally helically extending channels. With such an arrangement, three helical bars are provided, the intermediate bar serving as a ball abutment to deflect balls into either of the ball return passages, depending upon the direction of relative rotation between the ball nut and screw.

2
DETAILED DESCRIPTION

Figure 1:
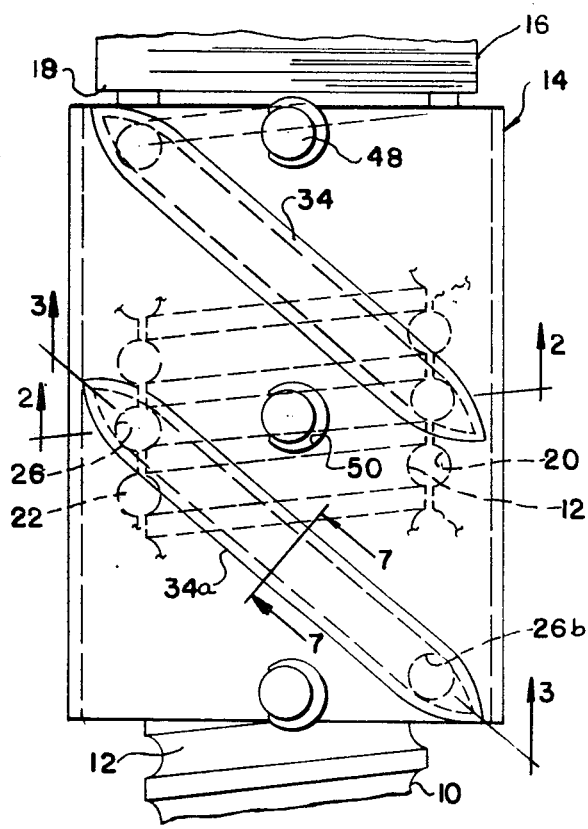
FIG. 1 is a plan view of the assembly of the ball nut and screw.

Referring now to FIG. 1, the ball screw shaft is indicated at 10 and is provided with a generally arcuate thread groove 12 which extends helically of the screw. The ball nut is indicated generally at 14 and comprises a body which is of generally cylindrical configuration. At one end the body has a threaded extension 16 separated from the nut proper by an external annular groove 18. The threaded extension 16 is for connection of the nut to structure which is adapted to be moved relatively longitudinally of the screw.

At its interior surface the nut is provided with a helically extending thread groove 20 which is in matching relation and associated with the external thread groove 12 of the nut so as to define a ball receiving passage indicated generally at 22, suitably dimensioned with respect to the balls 24 so that the balls have rolling contact with cooperating thread surfaces as the nut and screw are relatively rotated.

Means are provided for deflecting the balls to move outwardly of the nut and to return them to a new position as relative rotation continues. Thus, the balls in effect circulate in an endless passage, a portion of which is a helix of several turns defined by the confronting thread groove portions of the nut and screw. The remainder of the circulating passage is the return passage which receives balls from the thread passage and returns them externally of the nut to the thread passage to begin their movement along the thread configuration of the ball and nut.

Figure 2:
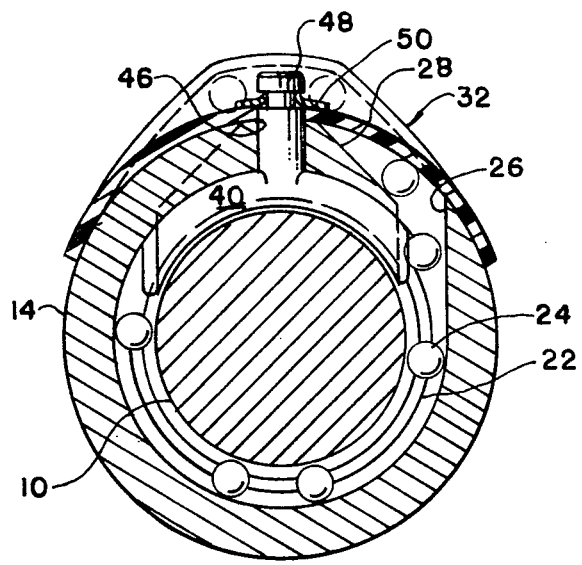
FIG. 2 is a section on the line 2—2, FIG. 1.

For this purpose and as best seen in FIG. 2, the nut 14 is provided with openings 26 which extend generally tangentially into the thread groove formed in the nut body. Each of the openings 26 is in communication with a groove or channel 28 which intersects the tangential opening 26 and which diminishes in depth until it terminates or runs out into the smooth cylindrical surface at the exterior of the nut as indicated at 30.

Associated with the nut 14 is a cover 32 preferably formed of plastic material having a thickness such that it may be readily deformed into the configuration illustrated in the drawings. The shell or cover 32, generally cylindrically formed having for example an annular extent of approximately 150°, is adapted to overlie the tangential openings 26 formed in the nut body.

Figure 7:
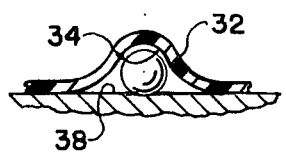
FIG. 7 is a fragmentary section on the line 7—7, FIG. 1.
Figure 3:
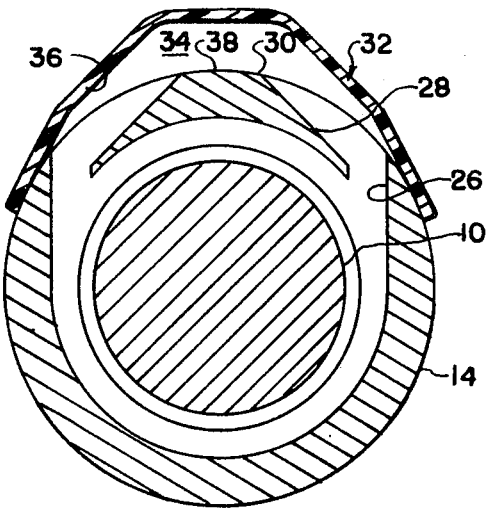
FIG. 3 is a sectional view on the line 3—3, FIG. 1.

The cover is provided with deformed grooves or channels 34 which cooperate with the openings 26 and the grooves or channels 28 formed in the exterior surface of the nut 14. The grooves or channels 34 in the cover taper in depth at their ends as clearly indicated by the reference character 36 and this decrease in depth in effect matches the variable depth of the grooves or channels 28 so that the surfaces of the external grooves or channels 28 in the nut body and the interior surfaces of the grooves or channels 36 in the cover 32 define substantially enclosed continuous ball passages. The intermediate portion of the ball passages, as best illustrated in FIG. 7, comprises a portion of the smooth cylindrical exterior surface of the nut body as indicated in this Figure at 38 and also clearly indicated in FIG. 4.

Figure 5:
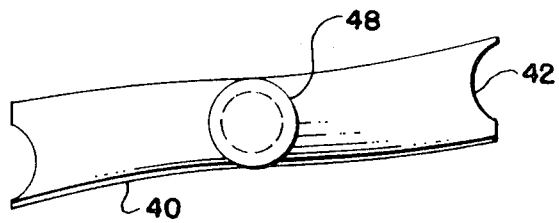
FIG. 5 is a plan view of the ball deflector.
Figure 6:
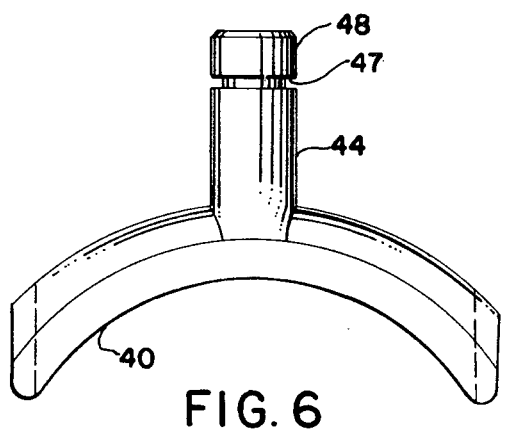
FIG. 6 is an elevational view of the ball deflector.

In order to deflect the balls as they move around the ball receiving passage 22 and to retain the cover 32 in properly assembled position, ball deflectors, best illustrated in FIGS. 5 and 6, are provided. Each of these ball deflectors comprises a short helical bar portion 40 of generally circular cross-section and adapted to be received in a portion of the thread groove of the nut and to extend into the cooperating portion of the thread provided in the screw. The helical bars 40 are cylindrically recessed at their ends as indicated at 42 to provide surfaces which cooperate with portions of the surfaces of the openings 26 to define generally tangential ball guide passages as best indicated in FIG. 2. Each of the bar portions 40 carries a stem 44 which is adapted to extend through a radial opening 46 in the nut body. Similar or matching openings are provided in the cover 32 as best indicated in FIG. 2. The stem 44 includes an annular groove 47 positioned below an external head 48 which is adapted to extend through the opening in the cover and to retain the cover in position in association with a C-clamp or U-clamp 50.

Figure 4:
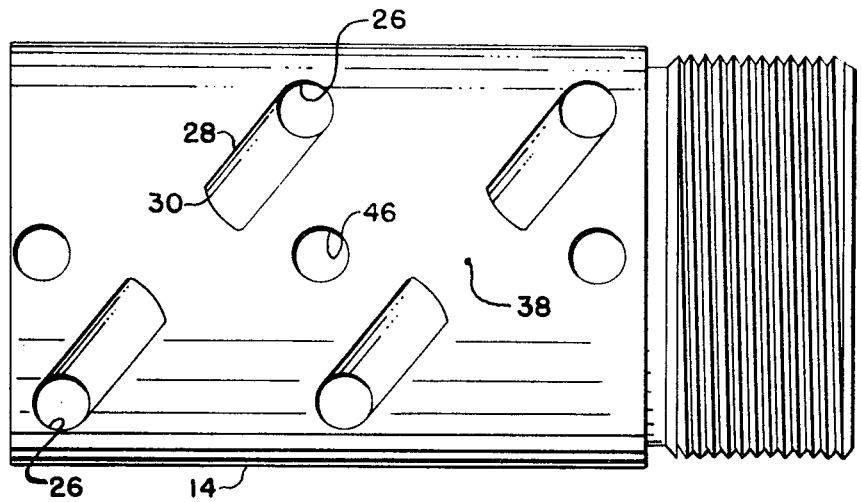
FIG. 4 is a plan view of a portion of the nut with the cover removed.

As best illustrated in FIGS. 1 and 4, a ball nut designed to have two ball circulating paths therein is provided with three of the radial openings 46 each of which receives a stud or stem 48 of a ball deflector.

It will be apparent from FIG. 2, which is a sectional view along a single thread, that the ball deflector bar 40 is adapted to engage balls moving clockwise of the assembly at its left hand end and to cause these balls to move outwardly through the opening designated 26 in FIG. 2 and to cause these balls to traverse the ball passage which includes the channel portion 34a of the cover to the tangential opening 26b at which point the balls again enter into cooperation between the confronting ball receiving thread portions of the nut and screw. Upon reverse relative rotation between the screw and nut, the balls engage the opposite end of the ball receiving portion and are deflected outwardly and pass in the opposite direction through the ball passage defined in part by the groove or channel 34 formed in the cover and in part by the helical grooves or passages 28 formed at the exterior of the nut body.

The present construction represents an advance over prior known ball nut and screw combinations in several particulars. In the first place, the use of the plastic cover which cooperates with grooves or channels in the exterior of the cylindrical nut body to form ball return passages provides extremely quiet operation and protects the balls against wear or damage as they are circulated in a return flow. Secondly, the helical configuration of the ball return passage resulting from the helical configuration of the channel or groove portions provided at the interior of the cover and at the exterior of the nut body, provides for the most efficient flow of balls as they return for reuse from the exit passage to the reentrance passage into the ball nut.

In addition, since grooves or recesses 28 terminate or run out into the smooth cylindrical surface of the nut body, a portion of the ball return passage is defined by this surface. This simplifies the construction and provides maximum economy in producing the nut, since it is formed by simple machining operations, starting from ordinary tubular stock.

The use of the ball deflectors with headed stems for association with C-clamps or U-clamps provides for extremely efficient assembly and at the same time for accurate location of the external cover in the position required for most efficient cooperation with the ball return grooves at the exterior of the ball nut.

What I claim as my invention is:

1. A ball nut for association with an elongated ball screw, said nut being generally of cylindrical configuration provided with an internal ball receiving thread groove, said nut having at least a pair of openings extending from its exterior surface in substantially tangential relation to the internal thread groove, the exterior surface of said nut having inclined grooves of variable depth, each of said grooves being in communication with one of said openings and extending toward but terminating short of a similar inclined groove communicating with the second opening of the pair, a cover plate overlying a portion of the cylindrical exterior surface of said nut and having an internal groove of variable depth communicating with the pair of grooves formed in the exterior surface of said nut to define therewith and with the smooth uninterrupted cylindrical surface portion of the nut a continuous ball return passage.

2. A nut as defined in claim 1 in which a plurality of pairs of openings are provided in the nut and a corresponding number of internal grooves are provided at the interior surface of the cover.

3. A nut as defined in claim 1 in which the cover is formed of a thin shell of uniform thickness of plastic material deformed to the required configuration to provide the internal grooves.

4. A nut as defined in claim 3 in which said plastic shell, except for the portions deformed into the aforesaid grooves, is of generally cylindrical configuration and is adapted to be retained in close surface-to-surface relationship with the smooth exterior cylindrical surface of the nut.

5. A nut as defined in claim 4 in which the nut body has a generally radial opening extending into a thread groove at the interior of the nut, a ball deflector having a helically extending bar partially received in the thread groove in the nut, said bar having a stem extending through the radial opening and through an opening in said cover, and means retaining the stem against inward movement of the opening to retain the deflector bar in position and to retain said cover on said nut.

* * * * *